(12) United States Patent
Meyer

(10) Patent No.: US 8,786,126 B2
(45) Date of Patent: Jul. 22, 2014

(54) WIND TURBINE HAVING TWO HEMISPHERICAL BLADES

(76) Inventor: Thomas Meyer, Cleveland, OH (US)

( * ) Notice: Subject to any disclaimer, the term of this patent is extended or adjusted under 35 U.S.C. 154(b) by 23 days.

(21) Appl. No.: 13/549,991

(22) Filed: Jul. 16, 2012

(65) Prior Publication Data

US 2014/0015254 A1    Jan. 16, 2014

(51) Int. Cl.
*F03D 9/02* (2006.01)

(52) U.S. Cl.
USPC .............................................. 290/55; 290/44

(58) Field of Classification Search
USPC ............. 290/44, 55; 415/4.2, 4.4; 416/132 B, 416/227 A
See application file for complete search history.

(56) References Cited

U.S. PATENT DOCUMENTS

| | | | | | |
|---|---|---|---|---|---|
| 4,293,274 | A | * | 10/1981 | Gilman | 416/51 |
| 4,449,053 | A | * | 5/1984 | Kutcher | 290/44 |
| 5,203,672 | A | * | 4/1993 | Wolf | 415/2.1 |
| 5,405,246 | A | * | 4/1995 | Goldberg | 416/227 A |
| 7,329,099 | B2 | * | 2/2008 | Hartman | 416/132 B |
| 7,393,177 | B2 | * | 7/2008 | Rahai et al. | 415/4.2 |
| 7,976,267 | B2 | * | 7/2011 | Burrell, IV | 415/4.2 |
| 7,980,823 | B2 | * | 7/2011 | Akamine | 416/131 |
| 2008/0007068 | A1 | * | 1/2008 | Ward | 290/55 |
| 2009/0167028 | A1 | * | 7/2009 | Akamine | 290/55 |
| 2010/0295316 | A1 | * | 11/2010 | Grassman | 290/55 |
| 2011/0027084 | A1 | * | 2/2011 | Rekret | 416/126 |
| 2012/0068467 | A1 | * | 3/2012 | Morgan et al. | 290/55 |
| 2013/0142657 | A1 | * | 6/2013 | Farb et al. | 416/223 R |

* cited by examiner

*Primary Examiner* — Vanessa Girardi
(74) *Attorney, Agent, or Firm* — Howard M. Cohn; Daniel Cohn

(57) ABSTRACT

A wind turbine having two blades is rotated by omnidirectional gas motion. A generator is connected by a shaft to the wind turbine for generating electrical power by the rotation of the wind turbine. A method of extracting energy from moving gas comprises rotating a wind turbine having two blades by omnidirectional gas motion. The method includes connecting a generator by a shaft to the wind turbine and generating electrical power by the rotation of the wind turbine.

18 Claims, 6 Drawing Sheets

WIND TURBINE HAVING TWO HEMISPHERICAL BLADES

TECHNICAL FIELD OF THE INVENTION

The present disclosure relates to wind turbines, and more particularly to a wind turbine comprised of two spherical portions and having an axis of rotation that is vertically oriented and perpendicular to the direction of the wind from which energy is being extracted.

BACKGROUND OF THE INVENTION

Wind turbines can be generally divided into two types: 'horizontal axis' wind turbines (HAWT) haying an axis of rotation arranged to be aligned with prevailing wind direction; and cross-flow or 'vertical axis' wind turbines (VAWT) having an axis of rotation arranged to be generally perpendicular to the prevailing wind direction.

Within the VAWT category, turbines generally fall into one of two further categories: drag-type and lift-type.

Drag-type turbines, of which the most well known is the Savonius wind turbine, operate by having blades which each have a greater drag when moving with the wind than when moving into the wind. This difference in drag, induces a torque about an axis, causing rotation of the blades about the axis. Lift-type turbines, such as Darrieus turbines, use airflow about the blades to generate a lift force on the blades, which is translated into rotational movement.

Drag-type blades are necessarily limited to travelling slower than the prevailing winds. Lift-type blades, however, can reach a tip speed ratio (velocity of blade tip: prevailing wind velocity) well in excess of 1.0.

Lift-type VAWT are generally significantly more efficient in producing power than drag-type VAWT. Nonetheless, various problems have been experienced in producing efficient VAWTs for commercial applications.

One problem is in turbine start-up, and operation in light winds. Lift-type turbines rely on the lift provided by the rotating blade—thus rotation of the turbine requires a certain speed to be self sustaining. This may require the provision of a motor to start the turbine. Similarly, if the wind speed is not sufficient to maintain the minimum turbine rotation speed, the turbine will stop.

Another problem experienced is in the spacing of adjacent turbines. Wind turbines generally operate best in 'clear' air, without nearby obstacles which could act to slow or otherwise disturb wind flow. For this reason, it is generally necessary to space wind turbines so that they do not interfere with each other's air flow. One way around this spacing problem is to incorporate a cutaway or 'cupped' feature into the inner face of each turbine blade. The idea behind this concept is that the turbine will use the difference in drag between the outer and inner surfaces of the blade to generate torque at low speeds, with this torque being sufficient to accelerate the rotor to a speed where sufficient rotational torque is generated so as to drive an electrical generator.

SUMMARY OF THE DISCLOSURE

According to a preferred embodiment, a wind turbine comprises a wind turbine having two blades being rotated by omnidirectional gas motion. A generator is connected by a shaft to the wind turbine for generating electrical power by the rotation of the wind turbine.

Further according to a preferred embodiment, a method of extracting energy from moving gas comprises rotating a wind turbine having two blades by omnidirectional gas motion. The method includes connecting a generator by a shaft to the wind turbine and generating electrical power by the rotation of the wind turbine.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting.

Certain elements in some of the figures may be omitted, or illustrated not-to-scale, for illustrative clarity. The cross-sectional views may be in the form of slices, or near-sighted cross-sectional views, omitting certain background lines which would otherwise be visible in a true cross-sectional view, for illustrative clarity.

Often, similar elements may be referred to by similar numbers in various figures (FIGs) of the drawing, in which case typically the last two significant digits may be the same, the most significant digit being the number of the drawing figure (FIG).

FIG. 1A is an oblique view of a wind turbine and generator, in accordance with the present invention.

FIG. 1B is an oblique schematic view of the wind turbine and generator of FIG. 1 when used in relation to a smoke stack, in accordance with the present invention.

FIG. 2A is an orthogonal side view the turbine part of the wind turbine and generator, in accordance with the present invention.

FIG. 2B is an orthogonal side view of a spherical shell illustrating the shapes of the wind turbine blades, in accordance with the present invention.

FIG. 2C is an orthogonal top view of the wind turbine portion, in accordance with the present invention.

FIG. 3A is an orthogonal side view of a single blade of the present wind turbine, in accordance with the present invention.

FIG. 3B is an orthogonal top view of a single blade of the present wind turbine, in accordance with the present invention.

FIG. 4A is an orthogonal top view detail view of the top of the wind turbine blades, showing how they are joined together by a circular plate connected to a drive shaft, in accordance with the present invention.

FIG. 4B is an oblique view detail view of the top of the wind turbine blades, showing how they are joined together by a circular plate connected to a drive shaft, in accordance with the present invention.

FIG. 5 is a cross sectional view of the wind turbine blade edges and the dihedral angle of the circular plate connecting the blades together, in accordance with the present invention.

DETAILED DESCRIPTION OF THE DISCLOSURE

Figure 1A:
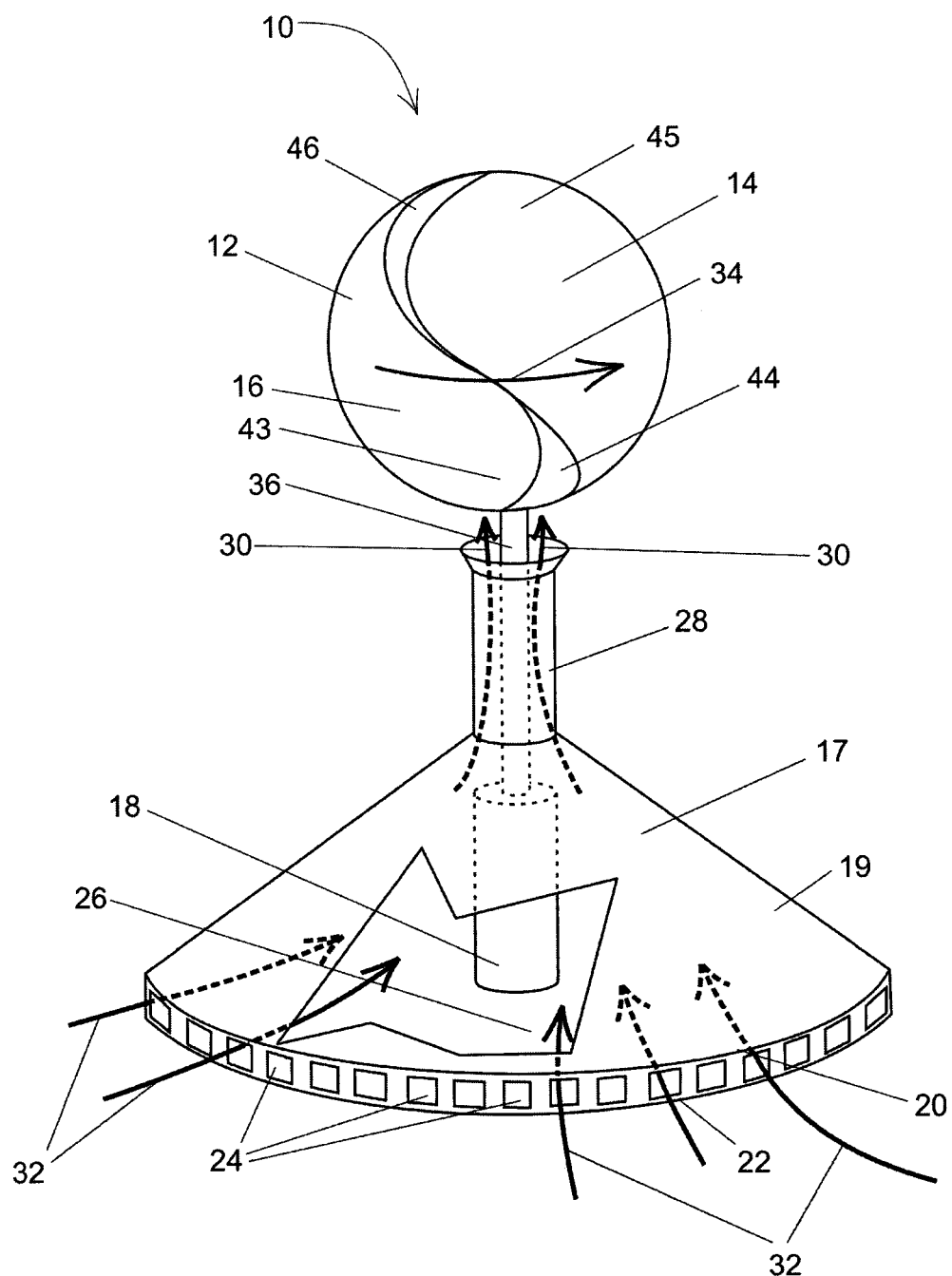

The wind turbine and generator 10 of the preferred embodiment is able to operate in any one of three modes: (1) by extracting energy from the motion of ambient horizontal air motion, i.e., wind; (2) by extracting energy from sun-heated air that is initially entrained in a base assembly 17 that, when sunlight shines upon it, heats the air, causing it to rise up a hollow stack 28 mounted at one end to the base assembly 17 and housing a shaft 36 connecting a generator 18 to the wind turbine 12. The stack 28 directs the air against the lower or bottom portion 43 of a novel wind turbine 12; and (3) by situation the turbine 12 upon a smoke stack or equivalent source of rising hot air so as to extract energy from the rising air or gas. In all three instances of operation, the rotating turbine transmits torque and rotational power by means of a shaft 36 to a generator 18 that is situated with the base assembly 17.

FIG. 1A shows in oblique perspective view the present wind turbine and generator assembly 10 consisting of a turbine 12 having two blades 14,16 and a base assembly 17 containing a generator/alternator 18. The base assembly 17 is shown in partial cutaway view of the outer housing 19 so as to partially reveal the generator/alternator 18. Disposed about the perimeter 20 of the lower portion 22 of the base assembly 17 is a row of evenly spaced air inlet ports 24.

First Mode of Operation—Wind

In the first mode of operation, in ordinary generally horizontal wind, i.e., generally the wind turbine and generator assembly 10, including the wind turbine 12 and the base assembly 17 with generator/alternator 18, is situated in such a setting where winds are commonly available and of sufficient strength to cause the turbine to rotate, as indicated by arrow 34 in FIG. 1A. Note that the design of the turbine 12, with its blades 14,16 is such that the wind (not shown) can blow from any horizontal direction, generally across without requiring that the wind turbine assembly 10 having to undergo any reorientation of attitude of the sort that is commonly seen in tradition propeller type wind turbines which have to "face into" the wind. The present wind turbine and generator 10 is omnidirectional, with the base assembly 17 performing the function of supporting the turbine 12 and housing the generator 18. That is, the wind turbine is caused to rotate by air motion with vertical and horizontal components or otherwise described in any direction including up, down, east, west, north and south.

Second Mode of Operation—Solar Heating of Rising Air Column

In the second mode of operation, wherein air is heated in the base assembly 17 (FIG. 1A) so as to cause it to rise through a stack 28, the base assembly 17, which is made of metal, is painted a dark color, or a low albedo color with respect to the visible, infrared, and ultraviolet wavelengths of sunlight, the object being to heat air that is inside a plenum 26 that houses the generator/alternator 18 so as to cause it to rise. That is to say, air that is heated inside plenum 26 within the base 17 becomes less dense as it is heated and hence rises through stack 28, in a direction indicated by flow arrows 30, the arrows being used here generally to indicate vertically moving air from the base 17. Air motion that is indicated by arrows 32 represents ambient air that is entering and to be heated within the base assembly 17. More specifically, the incoming air, indicated by arrows 32 near the inlet ports 24, gets heated inside the plenum 26 within the base assembly 17 and thence rises through the vertical stack 28. Air 30 ascending in the stack 28, impinges upon the bottom portion 43 of the wind turbine 12, causing it to rotate, as indicated by arrow 34, and thus to deliver torque and rotational power to the generator/alternator 18 by way of shaft 36. In other words, the rising air 30 inside the plenum 26 and stack 28, having been heated by hot inner surfaces of the base assembly 17, causes the volume of the plenum 26 to have a low atmospheric pressure relative to incoming ambient air 32 entering the plenum, thereby causing ambient air 32 to be drawn into the plenum by way of air inlet ports 24. Rising air 30 from stack 28 impinges upon and enters a lower part 43 of the turbine 12 at two inlet regions 44 (one of which is out of view) that are between blades 14,16 in a lower part of the wind turbine and subsequently to exit the wind turbine through two exhaust regions 46 (only one of which is visible in this view) in an upper part 45 of the turbine.

Third Mode of Operation—Use with Rising Air or Gas from a Smoke Stack

Figure 1B:
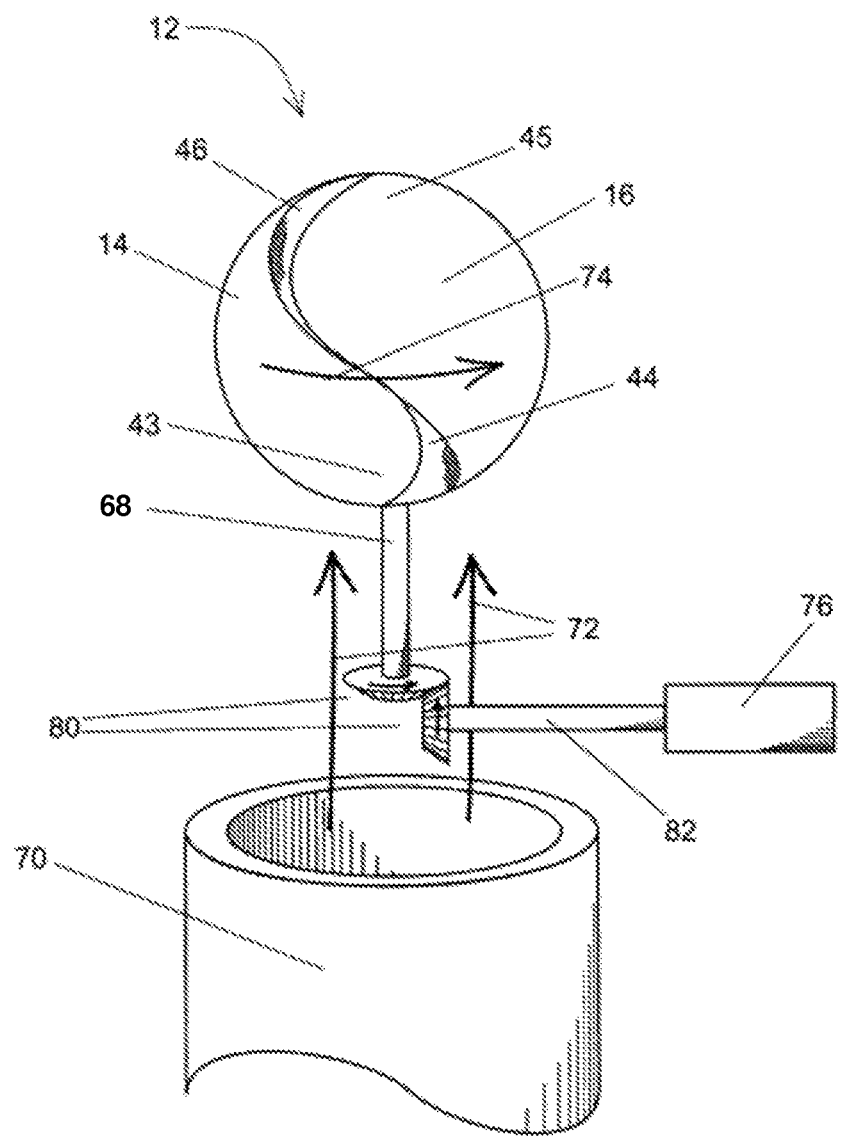

FIG. 1B is a schematic illustration of the third mode of operation wherein the wind turbine portion 12 of the foregoing wind turbine and generator assembly 10 (FIG. 1A) is disposed as shown upon a stack or chimney 70 or similar source of rising air, steam, or other gas, as indicated by arrows 72. The rising gas 72 from the stack or chimney 70 impinges upon the bottom portion 43 of the wind turbine 12, causing it to rotate, as indicated by arrow 74, and thus to deliver torque and rotational power to the generator/alternator 76 by way of a first shaft 78 (compare shaft 78 in FIG. 1B), a gear assembly 80, and a second shaft 82. The generator/alternator 76 is shown at the end of the shaft and gear train 78,80,82 so as to keep is away from excessive heat exposure that might be associated with the gases 72 rising from the stack or chimney structure 70. (No supporting structure is shown in FIG. 1B for the turbine 12, shafts 78,82, gear assembly 80, or generator 76.) The rising gas 72 from the chimney or stack 70 impinges upon and enters a lower part 43 of the turbine 12 at two inlets 44 (one of which is out of view) that are between blades 14,16 and subsequently exits the wind turbine at two exhausts 46 (only one of which is visible in this view) in an upper part 45 of the turbine.

General Turbine And Blade Design Considerations

The foregoing three modes of operation all have in common the following general design considerations with respect to the wind turbine 12 and the blades 14,16.

Figure 2A:
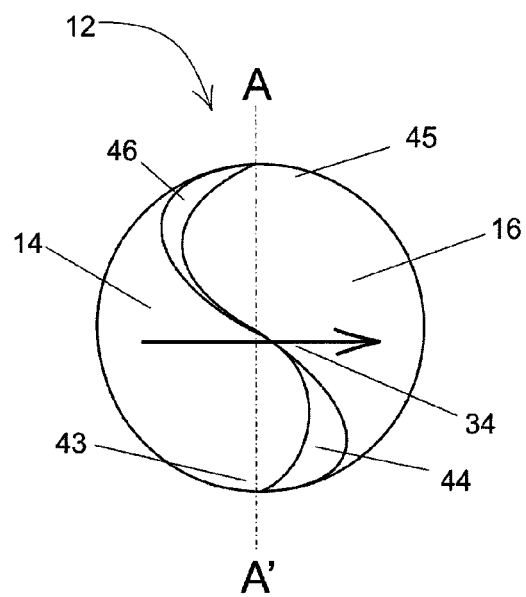
Figure 2C:
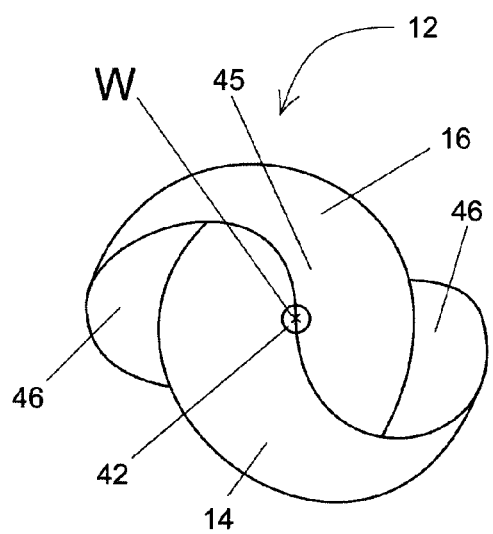

FIG. 2A shows an orthogonal side view the turbine part 12 of the present wind turbine and generator 10. The turbine 12 rotates in a direction indicated by arrow 34 about a vertical axis A-A'. The turbine 12 is a more or less spherical structure consisting of two blades 14,16 each of which is an identical areal segment comprising half the surface area of a spherical shell 40, as illustrated in orthogonal side view in FIG. 2B having an vertical axis B-B'. FIG. 2C is an orthogonal top view of the turbine 12 with its two blades 14,16 that are separated by exhaust regions 46 in the upper part 45 of the turbine. The axis of rotation W is oriented normal to the sheet of FIG. 2C and is located within circle 42.

Figure 2B:
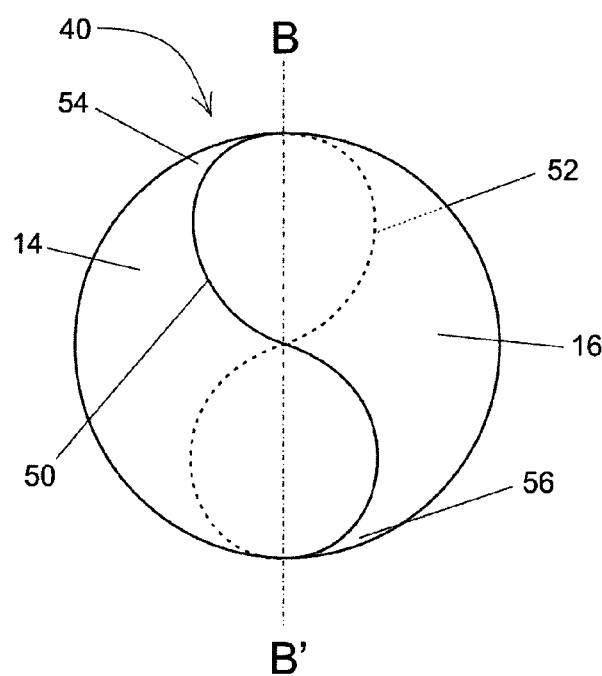

Referring again to FIG. 2B, cut lines 50,52 in the spherical shell 40 from which the blades 14,16 are cut, are each an approximate sinusoid of one full cycle in the view of FIG. 2B, vertically oriented, as is evident in the orthogonal side view of FIG. 2B which shows a forward cut line 50 and a rear one (dotted sinusoidal line) 52 on the far side of the spherical shell. The spherical shell 40 of FIG. 2B is not a wind turbine; rather it simply illustrates the complex shape of each of the blades 14,16. The two cut lines 52,54 taken together comprise a single two-wavelength sinusoid that extends from the top 54 of the spherical shell to the bottom 56 and then continues back to the top on the far side that is out of direct view in the FIGURE.

Figure 3A:
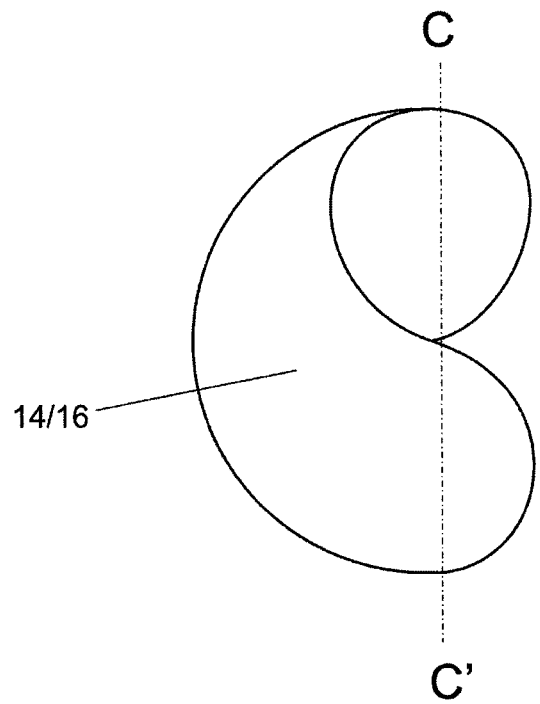

FIG. 3A is an orthogonal side view of a single turbine blade 14/16 showing the location of a vertical axis of rotation C-C'.

Figure 3B:
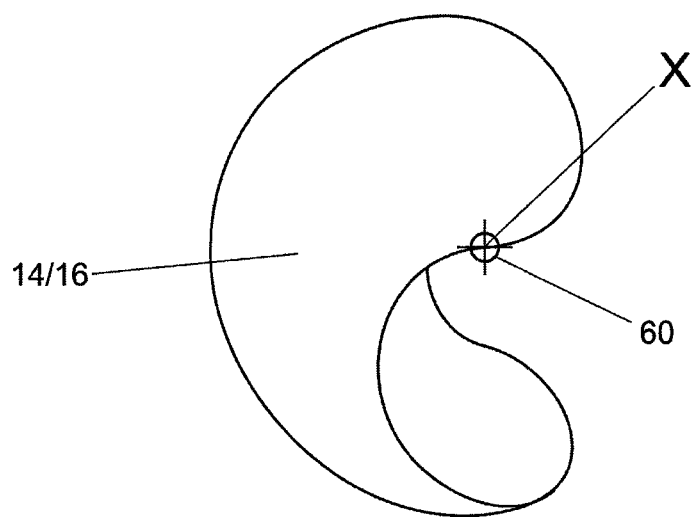

FIG. 3B is an orthogonal top view of the same single turbine blade 14/16. The axis of rotation X is normal to the page and located within the circle 60.

Figure 4A:
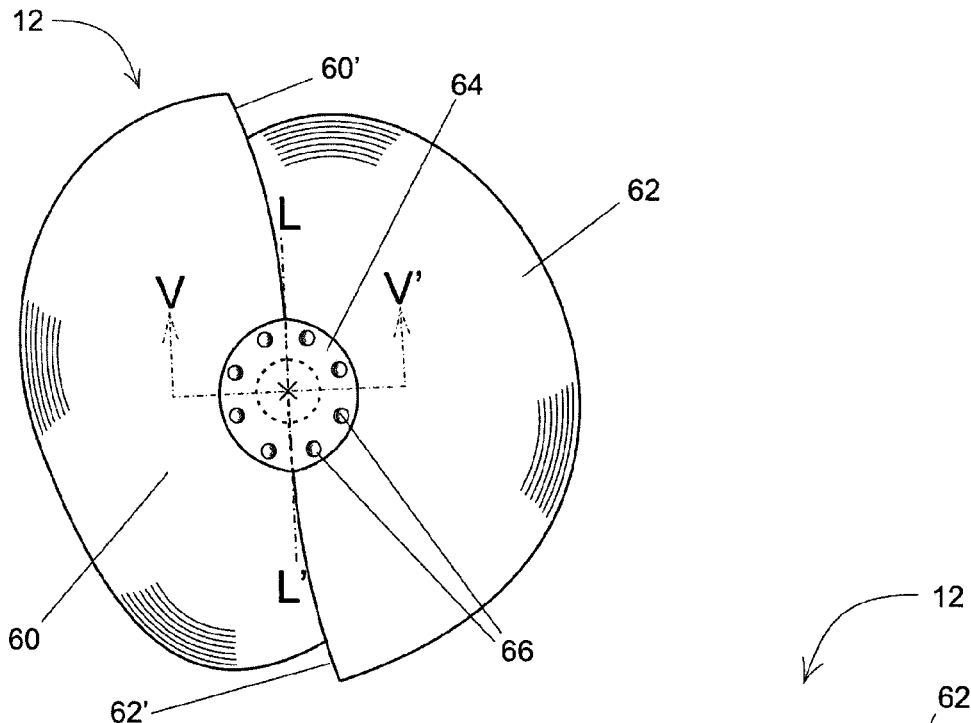
Figure 4B:
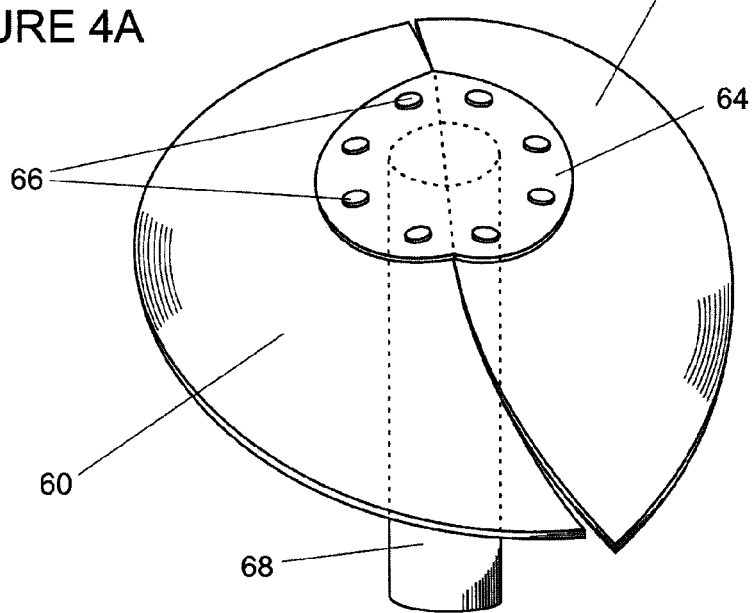

FIG. 4A is an orthogonal top view of the wind turbine portion 12 of the wind turbine and generator 10, illustrating how blade segments 60,62 are joined together by means of a circular plate 64. Fasteners 66 join the blade segments 60,62 to the circular plate 64. Edges 60',62' of the respective blades 60,62 butt together beneath the plate 64 in FIG. 4A. FIG. 4B is an oblique view of the top portion 61 of the wind turbine 12, showing the circular plate 64, fasteners 66, and also shaft 68 which transmits torque and rotational power to the generator (not shown in this view).

Figure 5:
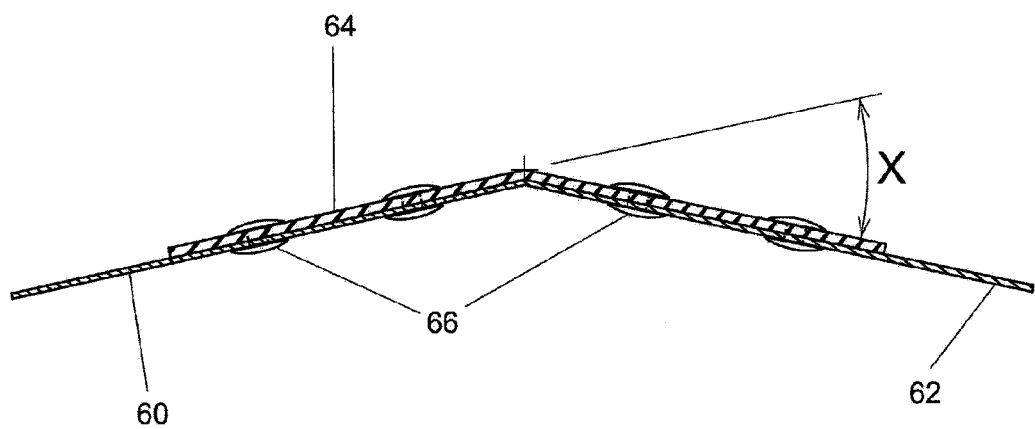

Note in FIG. 4A the dashed line L-L', which defines, beneath the plate 64, a butt junction of the blade edges 60',62' of the blade segments 60,62. The circular plate 64 is creased along this line so as to form a dihedral angle W which is illustrated in FIG. 5. The dihedral angle X determines the deflection or relative positions of the blades 14,16 (FIG. 1A) and the blade segments 60,62 and the actual blades 14,16. The dihedral angle X is preferably in the range of 10 degrees to 40 degrees.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. A wind turbine, comprising:
   a wind turbine having two blades connected by a shaft extending between an upper and a lower portion of the two blades and being rotated about the shaft by omnidirectional gas motion with vertical and horizontal gas components;
   the turbine being a generally spherical shell consisting of the two blades, each of which is an identical areal segment comprising half the surface area of the spherical shell and having a blade edge formed of a single two-wavelength sinusoid that extends from the upper portion to the lower portion of the spherical shell and then back to the upper portion on a far side of the shell; and
   a generator connected by the shaft to the wind turbine for generating electrical power by the rotation of the wind turbine.

2. The wind turbine of claim 1 wherein the two blades are rotated by omnidirectional air motion.

3. The wind turbine of claim 1 wherein the two blades are separated by two exhaust regions in an upper part of the turbine and two inlet regions in a lower part of the turbine.

4. The wind turbine of claim 1 wherein the two blades are joined together by a circular plate mounted to the upper portion of the two blades.

5. The wind turbine of claim 4 wherein the two blades butt together beneath the circular plate.

6. The wind turbine of claim 1 further including:
   a base assembly housing the generator;
   a plurality of spaced air inlet ports disposed about a perimeter of a lower portion of the base assembly; and
   a hollow stack mounted at one end to the base assembly and housing the shaft connecting the generator to the wind turbine.

7. The wind turbine of claim 6 wherein the plurality of spaced air inlet ports are evenly spaced about the perimeter of the lower portion of the base assembly.

8. The wind turbine of claim 1 wherein a butt junction of the blade edges of the two blades forms a dihedral angle W which determines the relative positions of the blades to each other.

9. The wind turbine of claim 8 wherein the dihedral angle is in the range of 10 degrees to 40 degrees.

10. The wind turbine of claim 8 wherein:
    wind turbine and generator are disposed above a source of rising gas whereby the gas impinges against a lower portion of the wind turbine causing it to rotate the generator by way of the shaft.

11. A method of extracting energy from moving gas comprising:
    providing a wind turbine being a generally spherical shell consisting of the two blades, each of which is an identical areal segment comprising half the surface area of the spherical shell and having a blade edge formed of a single two-wavelength sinusoid that extends from the upper portion to the lower portion of the spherical shell and then back to the upper portion on a far side of the shell;
    rotating the two blades of the wind turbine about a shaft extending between an upper and a lower portion of the two blades by omnidirectional gas motion with vertical and horizontal gas components;
    connecting a generator by the shaft to the wind turbine; and
    generating electrical power by rotating the wind turbine.

12. The method of claim 11 including rotating the two blades by omnidirectional air motion with vertical and horizontal air components.

13. The method of claim 11 including forming a dihedral angle W in the range of 10 degrees to 40 degrees of the blade edges of the two blades which determines the relative positions of the blades to each other.

14. The method of claim 11 including joining the two blades by a circular plate mounted to the upper portion of the two blades.

15. The method of claim 11 including separating the two blades by exhaust regions in an upper part of the turbine and inlet regions in a lower part of the turbine.

16. The method of claim 15 including:
    housing the generator in a base assembly having a plurality of spaced air inlet ports disposed about the perimeter of the lower portion of the base assembly;
    mounting a hollow vertical stack at one end to the base assembly;
    housing the shaft connecting the generator to the wind turbine within the stack; and
    heating air in the base assembly so that the air rises through the vertical stack to thereby impinge upon the lower portion of the wind turbine causing it to rotate and thus to deliver torque and rotational power to the generator by way of the shaft.

17. The method of claim 15 including:

disposing the wind turbine and generator above a source of rising gas;

impinging the gas against a lower portion of the wind turbine causing it to rotate the generator by way of the shaft.

18. The method of claim 17 including:

directing the rising gas into two inlets in the lower portion of the wind turbine;

allowing the rising gas to exit the wind turbine through two exhausts in an upper portion of the turbine causing it to rotate and thus to deliver torque and rotational power to the generator by way of the shaft.

\* \* \* \* \*